(12) United States Patent
Menkhoff

(10) Patent No.: US 8,761,681 B2
(45) Date of Patent: Jun. 24, 2014

(54) DEVICE AND METHOD FOR REDUCING AN ERROR SIGNAL COMPONENT OF A TRANSMIT SIGNAL IN A RECEIVE SIGNAL

(75) Inventor: Andreas Menkhoff, Oberhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 169 days.

(21) Appl. No.: 13/273,957

(22) Filed: Oct. 14, 2011

(65) Prior Publication Data

US 2012/0094605 A1   Apr. 19, 2012

(30) Foreign Application Priority Data

Oct. 14, 2010   (DE) .......................... 10 2010 042 475

(51) Int. Cl.
*H04B 1/00* (2006.01)
*H04B 15/00* (2006.01)

(52) U.S. Cl.
USPC ....................... 455/63.1; 455/67.13; 455/90.2

(58) Field of Classification Search
USPC .......... 455/63.1, 67.13, 90.2, 114.2, 283, 296
See application file for complete search history.

(56) References Cited

U.S. PATENT DOCUMENTS 7,289,765 B2 * 10/2007 Okada et al. .................... 455/45
2005/0147186 A1 * 7/2005 Funamoto et al. ............ 375/324
2007/0173282 A1    7/2007 Noda et al.

\* cited by examiner

*Primary Examiner* — Tuan H Nguyen
(74) *Attorney, Agent, or Firm* — Eschweiler & Associates, LLC

(57) ABSTRACT

A device for reducing an error signal component of a transmit signal in a receive signal, including an interface, a transmit signal generator, a transmitting/receiving device, a correction signal generator and a combiner. The combiner is configured to combine the receive signal with a correction signal from the correction signal generator in order to reduce the proportion that is based on the known wideband error signal component of the transmit signal in the receive signal.

21 Claims, 5 Drawing Sheets

DEVICE AND METHOD FOR REDUCING AN ERROR SIGNAL COMPONENT OF A TRANSMIT SIGNAL IN A RECEIVE SIGNAL

REFERENCE TO RELATED APPLICATIONS

This application claims priority to German Patent Application No. 042475.7, filed Oct. 14, 2010, the contents of which are hereby incorporated by reference in its entirety.

FIELD

Exemplary embodiments of the present invention describe a device for reducing an error signal component of a transmit signal in a receive signal, especially a device that transmits a transmit signal having a known wideband error signal component and which reduces in the receive signal the component that is caused by the known wideband error signal component of the transmit signal.

BACKGROUND

When a device that has a transmitter and a receiver such as, e.g., a mobile telephone, is very far away from a base station, the transmitter transmits a transmit signal having a maximum transmission power, but at the same time, a receive signal received by the receiver, e.g. a signal transmitted by the base station, is very weak. In such a scenario, a transmitter of simple structure can interfere with the receive signal or degrade the receive signal with a high noise level.

Furthermore, the higher the transmit bandwidth, the smaller will be the relative spacing between the transmit band and receive band. In the case of wideband systems, it thus becomes more and more difficult not to have interference between the receiver and the transmitter. Furthermore, the power consumption increases proportionally to the transmit bandwidth. In addition, it is necessary to increase the sampling frequency, resulting in a quadratic increase in the power consumption overall.

SUMMARY

The present invention is directed to reducing an error signal component of a transmit signal in a receive signal, that provides for a lower hardware expenditure and/or a lower power consumption.

The invention creates a device for reducing an error signal component of a transmit signal in a receive signal using an interface, a transmit signal generator, a transmitting/receiving device, a correction signal generator and a combiner. The interface is configured to obtain a narrow-band payload signal. The transmit signal generator is configured to generate a transmit signal having a known wideband error signal component based on the narrow-band payload signal. The transmitting/receiving device is configured to transmit a transmit signal on a transmit frequency and receive a receive signal on a receive frequency, a proportion of the known wideband error signal component of the transmit signal being superimposed on the receive signal. The correction signal generator is configured to generate a correction signal based on the known wideband error signal component of the transmit signal or a signal derived therefrom. The combiner is configured to combine the receive signal with the correction signal in order to reduce the proportion in the receive signal that is based on the known wideband error signal component of the transmit signal.

The invention also is directed to a method for reducing an error signal component of a transmit signal in a receive signal. Firstly, a narrow-band payload signal is obtained. Based on the narrow-band payload signal, a transmit signal having a known wideband error signal component is generated. The transmit signal is transmitted on a transmit frequency and a receive signal is received on a receive frequency, a proportion of the known wideband error signal component of the transmit signal being superimposed on the receive signal. Based on the known wideband error signal component or a signal derived therefrom, a correction signal is generated. The correction signal is combined with the receive signal in order to reduce the proportion which is based on the known wideband error signal component of the transmit signal.

BRIEF DESCRIPTION OF THE DRAWINGS

Exemplary embodiments of the present invention will be explained in greater detail in the text which follows, referring to the attached drawings, in which.

DETAILED DESCRIPTION

In the description of the exemplary embodiments of the invention which follows, identical or identically acting elements are provided with identical reference symbols in the figures.

Figure 5:
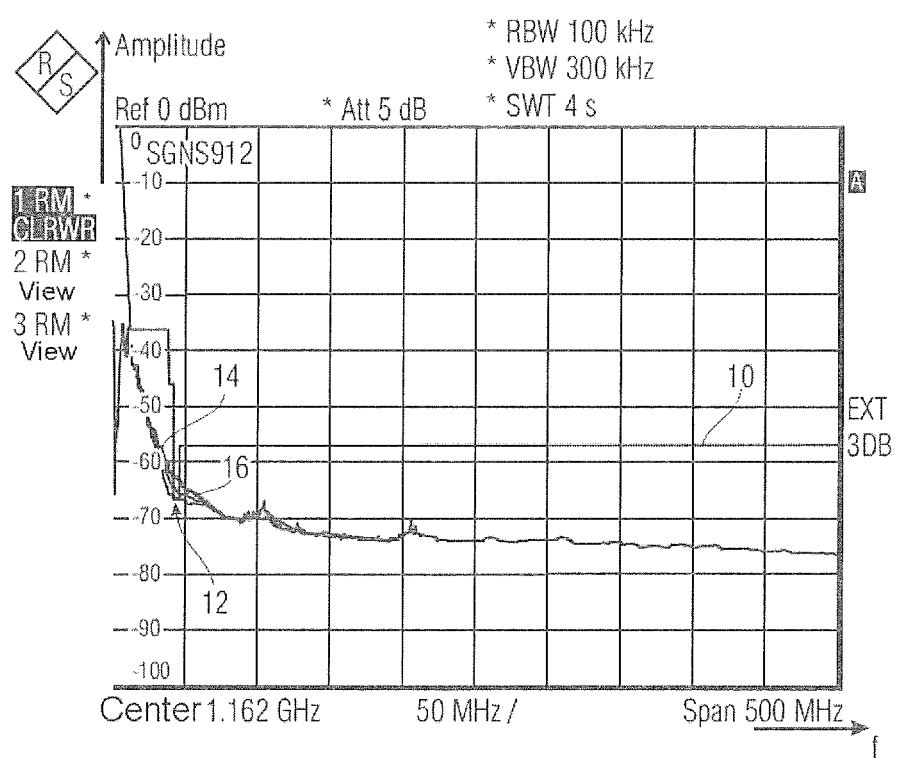
FIG. 5 shows illustratively three transmit signals from three transmitters constructed with different complexity within the frequency range.

FIG. 5 shows illustratively three transmit signals from three transmitters constructed with different complexity within the frequency range. FIG. 5 also shows the requirement for a transmit signal by means of a reference curve 10. The reference curve 10 thus corresponds to the maximum permissible amplitude variation for a transmit signal according to a predetermined specification. In this context, the receive frequency of a receive signal lies within the range in which the reference curve 10 exhibits a minimum 12. For the receiver to be able to receive a receive signal having a signal/noise ratio by means of which communication can be ensured in the scenario listed above, it is required that the transmitter transmits a transmit signal that meets the specification especially within the range of the receive frequency, that is to say the transmit signal lies below the reference curve 10. A first transmit signal 12 of the three transmit signals shown in FIG. 5 is transmitted by a first transmitter of simple structure and is distinctly above the reference curve 10 in the range of the receive frequency as a result of which the receive signal would be degraded by a high noise level. A second transmit signal 14 of the three transmit signals is transmitted by a second transmitter that is of more complex structure than the first transmitter. The second transmit signal 14 lies below the first transmit signal 12 within the range of the receive frequency, but above the reference curve 10 as a result of which the receive signal would also be degraded by high noise. The specification is only met by a third transmit signal 16 that is transmitted by a third transmitter with a complex structure.

Known concepts are correspondingly based on an improvement of the transmitter so that the transmit signal of the transmitter, starting with the first transmit signal 12, reaches the third transmit signal 16 via the second transmit signal 14. However, this is associated with high expenditure and with a high power consumption. However, a high power consumption should be avoided particularly in the case of mobile applications.

Instead of a transmitter having a complex structure with a high power consumption that, in order not to interfere with the receive signal, transmits a transmit signal having an interference signal component or an error signal component reduced in the receive band, a transmitter of simple structure that transmits a transmit signal having a known wideband error signal component that extends into the receive band of the receiver is used in the exemplary embodiments of the present invention. A proportion of the known wideband error signal component of the transmit signal is thus superimposed on the receive signal. This proportion is known and can thus be calculated out again in the receive signal or reduced by means of a combination with a correction signal in order to obtain a receive signal having a reduced error signal component. The device according to the invention thus enables a transmitter of simple structure having a low power consumption to be employed or used even in the scenario listed above.

Figure 1:
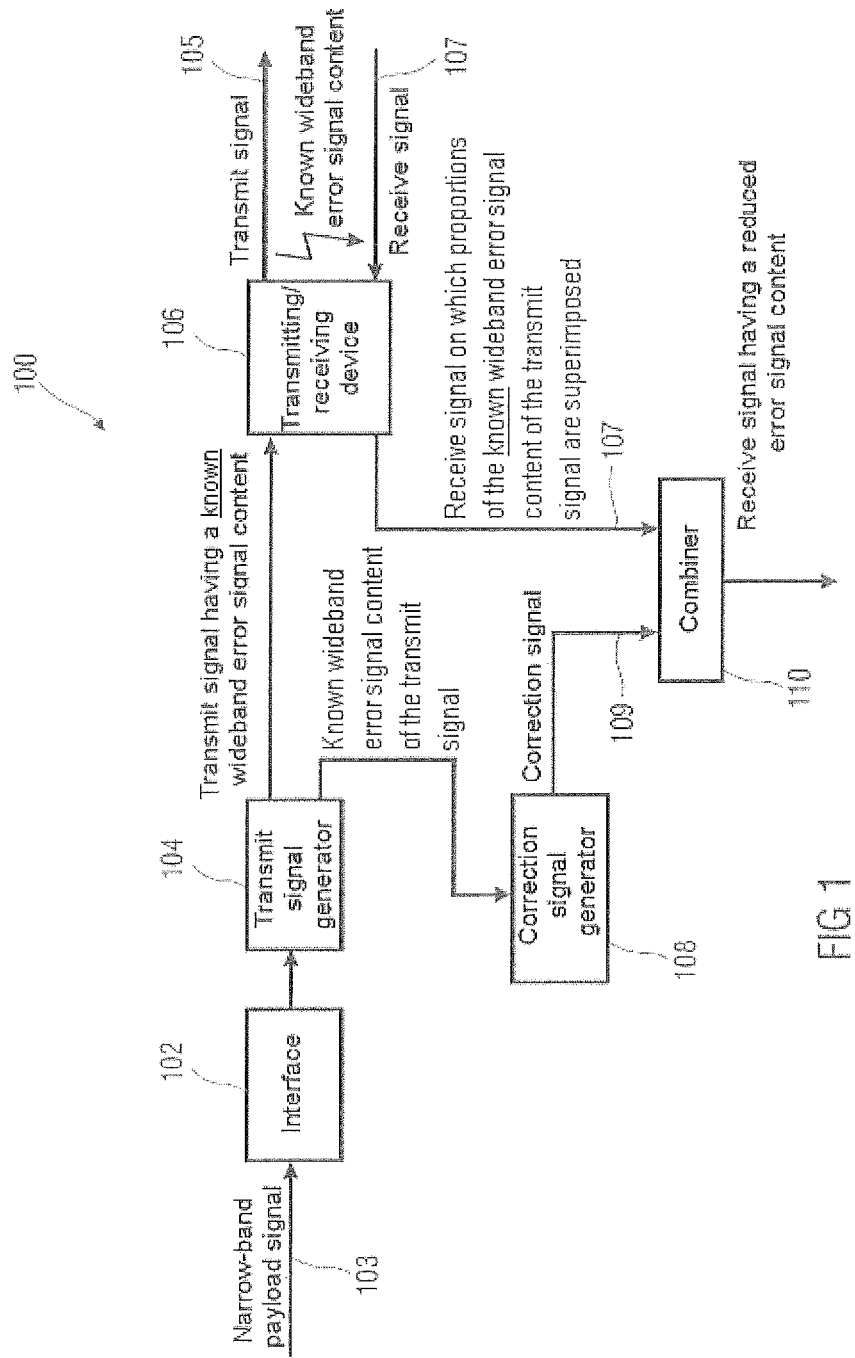
FIG. 1 shows a diagrammatic view of an exemplary embodiment of a device for reducing a known wideband error signal component of a transmit signal in a receive signal.

FIG. 1 shows a diagrammatic view of an exemplary embodiment of a device 100 for reducing a known wideband error signal component of a transmit signal in a receive signal. The device 100 exhibits an interface 102 that receives a narrowband payload signal 103. In exemplary embodiments, the narrow-band payload signal 103 can be, e.g. a digital information item that is transmitted via different symbols. In exemplary embodiments, the digital information item can also be represented by symbols in a complex plane such as is usual, e.g., in the case of xxPSK (Phase Shift Keying) or xxQAM (Quadrature Amplitude Modulation), where xx can specify, e.g., the number of symbols which can be transmitted differently.

The device 100 also includes a transmit signal generator 104 that is configured to generate, based on the narrow-band payload signal 103, a transmit signal 105 having a known wideband error signal component that extends into the receive band of the receiver. In exemplary embodiments, the known wideband error signal component of the transmit signal 105 additionally has such a low amplitude that, e.g., a known or conventional base station can receive the narrow-band payload signal 103 without problems. In other exemplary embodiments, the narrow-band payload signal 103 can be distorted or predistorted, in order to generate a known wideband error signal component, in such a manner that, e.g., a known base station can receive the narrow-band payload signal 103 without problems.

In exemplary embodiments, the transmit signal generator 104 comprises, e.g., an error signal generator and a signal combiner. The error signal generator in this arrangement is configured to generate a known wideband error signal. The error signal can be, e.g., a noise signal or a pseudo noise signal. In exemplary embodiments, the noise signal can be, e.g., a band-limited white or pink noise or a maximum length sequence. The signal combiner is configured to combine the narrow-band payload signal 103 with the known wideband error signal in order to generate a transmit signal 105 having a known wideband error signal component. In exemplary embodiments, the signal combiner is configured to, e.g., add the narrow-band payload signal 103 to the known wideband error signal component. In other exemplary embodiments, the combination between narrowband payload signal 103 and the known wideband error signal component can naturally also be based on another mathematical combination, such as, e.g., on a subtraction.

In exemplary embodiments in which, e.g., xxQAM or xxPSK is used for the transmission of a digital information item, the digital information item is represented by symbols in the complex plane only at the discrete sampling times. The base station is correspondingly synchronized with the discrete sampling times in order to receive the digital information item. The channel used in this process can be, e.g., an analog transmission channel. In order to be able to transmit a digital information item via an analog channel by means of a multiplicity of symbols in a complex plane, the symbol to be transmitted is transmitted at the sampling times, e.g., by means of a constant analog transmit signal which lies or remains on the corresponding symbol in the complex plane. Between the sampling times, however, an analog signal trajectory or an analog signal variation which joins the successive symbols is produced in the complex plane. Ideally, this signal variation corresponds, e.g., to a straight line which is spanned by in each case two successive symbols. If this straight line extends through the origin of the system of coordinates of the complex plane, a high instantaneous frequency is produced due to the phase rotation of the analog transmit signal by, e.g., 180°. If the signal variation is changed, e.g., in the area of the origin, e.g., by means of a signal pulse, in such a manner that the transmit signal is conducted around the origin, that is to say does not extend through the origin, the high instantaneous frequency can be reduced. At the same time, however, high-frequency disturbances are produced as a result that extend into the received band. One exemplary embodiment of the error signal is thus the signal pulse just described that conducts the transmit signal around the origin of the complex plane in, e.g., xxQAM or xxPSK.

Furthermore, the transmit signal generator 104 can have a pulse-shaping filter in exemplary embodiments. The pulse-shaping filter can be used, e.g., to change the signal shape of the narrow-band payload signal 103 in order to adapt the narrow-band payload signal 103, e.g., to the channel by limiting, e.g., the effective bandwidth of the transmission. In addition, an interference between the symbols, caused by the channel, can be avoided by means of the pulse shaping. In exemplary embodiments, the pulse-shaping filter can thus be utilized to adapt the payload signal to the transmit bandwidth. In exemplary embodiments, the pulse-shaping filter can be, e.g., a root-raised cosine filter, a Gaussian filter or a sine filter.

Furthermore, the transmit signal generator 104 can have, in exemplary embodiments, a convolutional device that is configured to convolve the narrow-band payload signal 103 with the pulse-shaping filter in order to generate a transmit signal 105 having a known wideband error signal component. In exemplary embodiments, the payload signal can be convolved, e.g., with a pulse-shaping filter of finite length, producing an only finite attenuation in the receive band.

The transmit signal 105 having the known wideband error signal component is forwarded to the transmitting/receiving device 106 by the transmit signal generator 104. The transmitting/receiving device 106 is configured to transmit the transmit signal 105 on a transmit frequency and receive the receive signal 107 on a receive frequency, a proportion of the known wideband error signal component of the transmit signal 105 being superimposed on the receive signal 107. In exemplary embodiments, the transmitting/receiving device 106 can exhibit, e.g., a transmitter and a receiver for this purpose. In exemplary embodiments, the transmitting/receiving device 106 can also have a transmitting/receiving interface configured to connect to a channel, e.g. an information channel or a transmission channel. In exemplary embodiments, the transmitting/receiving interface can be, e.g., an antenna or a connection for a cable-connected channel. Furthermore, the transmitting/receiving interface can be constructed in such a manner that a proportion of the known wideband error signal component of the transmit signal 105 is superimposed on the receive signal 107. Thus, the known wideband error signal component of the transmit signal 105 can be superimposed on the receive signal 107 via the transmitting/receiving interface and/or via the channel.

In exemplary embodiments, the narrow-band payload signal 103 of the transmit signal 105 is within the range of the transmit band of the transmitter so that the receive band of the receiver is not interfered with or degraded by a high noise level by the narrow-band payload signal 103 but only by the known wideband error signal component of the transmit signal 105. In exemplary embodiments, an amount of a difference between receive frequency and transmit frequency can be, e.g. within a range of from 1 MHz to 200 MHz, wherein this range can be, e.g., between 0.1 MHz and 2 GHz in another exemplary embodiment. In exemplary embodiments, the bandwidth of the narrow-band payload signal can lie, e.g., within a range of from 170 kHz to 40 MHz or within a range of from 20 kHz to 400 MHz, wherein the bandwidth of the receive signal 107 can lie, e.g., within a range of from 170 kHz to 40 MHz or within a range of from 20 kHz to 400 MHz. In exemplary embodiments, the known wideband error signal component of the transmit signal 105 can thus lie, e.g., within a range of from 340 kHz to 80 MHz or within a range of from 40 kHz to 800 MHz. In exemplary embodiments, the amplitude of the known wideband error signal component of the transmit signal 105 is also within a range of from 30 to 100 dB or within a range of from 10 to 120 dB below the amplitude of the narrow-band payload signal 103.

The device 100 also exhibits a correction signal generator 108 that is configured to generate a correction signal 109 based on the known wideband error signal component of the transmit signal 105 or a signal derived therefrom. In exemplary embodiments, the correction signal generator 108 can also be configured to generate the correction signal 105 by using channel estimation data. The channel estimation data can be obtained, e.g., by a calibration measurement in which, e.g., a known transmit signal 105 is transmitted with a known wideband error signal component and in which, e.g., no signal (receive signal 107) is transmitted by the base station, or the receive signal 107, e.g., is shielded. The signal received by the transmitting/receiving device 106 in this case thus exhibits only the proportion of the known wideband error signal component of the transmit signal 105 which lies within the receive band of the receiver. This proportion can be subsequently used for obtaining the channel estimation data.

In other exemplary embodiments, the channel estimation data can be based, e.g., on an estimation. In exemplary embodiments, the group delay and the transmission channel can be estimated for this, e.g., in order to obtain the channel estimation data. In exemplary embodiments, the channel estimation data can also be determined by means of a simulation of the transmitting/receiving interface and/or of the channel.

Furthermore, the correction signal generator 108, in exemplary embodiments, can have a modulation device that is configured to modulate the known wideband error signal component of the transmit signal 105, or a signal derived therefrom, by an amount of a difference between the transmit frequency and the receive frequency. The correction signal generator 108 can thus be configured to determine the proportion of the known wideband error signal component of the transmit signal 105 that is present in the receive band of the receiver and is thus received by the receiver. The correction signal generator 108 can thus be configured to determine the proportion of the known wideband error signal component of the transmit signal 105 that is superimposed on the receive signal 107 or which lies within the receive bandwidth of the receive signal 107 in order to generate, based on this proportion, a correction signal 109, e.g. by using channel estimation data.

In addition, the correction signal generator 108 can exhibit, in exemplary embodiments, a bandpass filter. In exemplary embodiments, the bandpass filter can be tuned, e.g., to the receive frequency of the receive signal in order to obtain or filter out, e.g. after the modulation of the known wideband error signal component of the transmit signal or a signal derived therefrom, the proportion that is superimposed on the receive signal 107.

The device 100 also exhibits a combiner 110 that obtains the correction signal 109 from the correction signal generator 108. Furthermore, the combiner 110 obtains from the transmitting/receiving device 106 the receive signal 107 on which the proportion of the known wideband error signal component of the transmit signal 105 is superimposed.

In exemplary embodiments, the device 100 can also exhibit between transmitting/receiving device 106 and combiner 110 a filter device that is configured to filter the receive signal 107 using a receive bandpass filter for obtaining a filtered version of the receive signal 107. In exemplary embodiments, this receive bandpass filter can be tuned, e.g., to the receive frequency of the receive signal 107. In exemplary embodiments, the bandpass filter of the correction signal generator 108 can also have the same filter parameters as the receive bandpass filter of the filter device.

The combiner 110 is configured to combine the receive signal 107 with the correction signal 109 in order to reduce in the receive signal 107 the proportion that is based on the known wideband error signal component of the transmit signal 105. In exemplary embodiments, the combiner 110 can be configured to, e.g., subtract the correction signal 109 from the receive signal 107 on which the proportion of the known wideband error signal component of the transmit signal 105 is superimposed. In other exemplary embodiments, the correction signal 109 and the receive signal 107, on which a proportion of the known wideband error signal component of the transmit signal 105 is superimposed, can be added, e.g., in the case of a correspondingly formed correction signal 109, in order to reduce the proportion of the known wideband error signal component of the transmit signal 105 in the receive signal 107. In exemplary embodiments, the combiner 110 can also exhibit an output which is configured to output the receive signal, thus obtained, with a reduced error signal component.

In exemplary embodiments, the device 100 can exhibit a hardware implementation, e.g. a baseband IC (Integrated Circuit) and an RF-IC (Radio Frequency IC). In exemplary embodiments, the known wideband error signal component of the transmit signal 105 can be introduced into the narrow-band payload signal 103, e.g. via the transmitter itself. The disturbances introduced by the transmitter during this process, e.g. digital disturbances, are completely known, however, and can therefore be subtracted again at the receiver end in the same RF IC before the receive signal 107 is forwarded to the baseband IC. Particularly in the case where a maximum transmit signal 105 is transmitted and a minimum receive signal 107 is received, an AD converter is not fully driven and is thus not overmodulated by a poor transmit signal 105. In exemplary embodiments, the disturbances that are superimposed on the receive signal are thus remodulated by the transmitter, estimated and subtracted in order to keep the disturbances as low as possible.

In exemplary embodiments, the narrow-band payload signal 103, e.g., a digital signal, is forwarded almost without disturbances or, respectively, without an error signal component by the baseband IC to the RF IC. In the RF IC, the narrow-band payload signal 103 can be distorted so that, e.g., it can be transmitted better. In an exemplary embodiment, the narrow-band payload signal 103 can be convolved, e.g., with a pulse-shaping filter of finite length, producing an only finite attenuation in the receive band. In another exemplary embodiment, the signal can be conducted around the origin, e.g., in order to reduce the high instantaneous frequencies in which context, however, high-frequency disturbances are caused that extend into the received band. The receiver then detects these distortions in the frequency deviation of the transmitter. Since the transmitter has caused these distortions in the, e.g., silicon RF IC, these modulated distortions can be cancelled again in the silicon RF IC at the receiver end. In exemplary embodiments, the receiver is thus configured to estimate, e.g., the group delay and the transmission channel in order to eliminate the disturbances or distortions, respectively.

Figure 2:
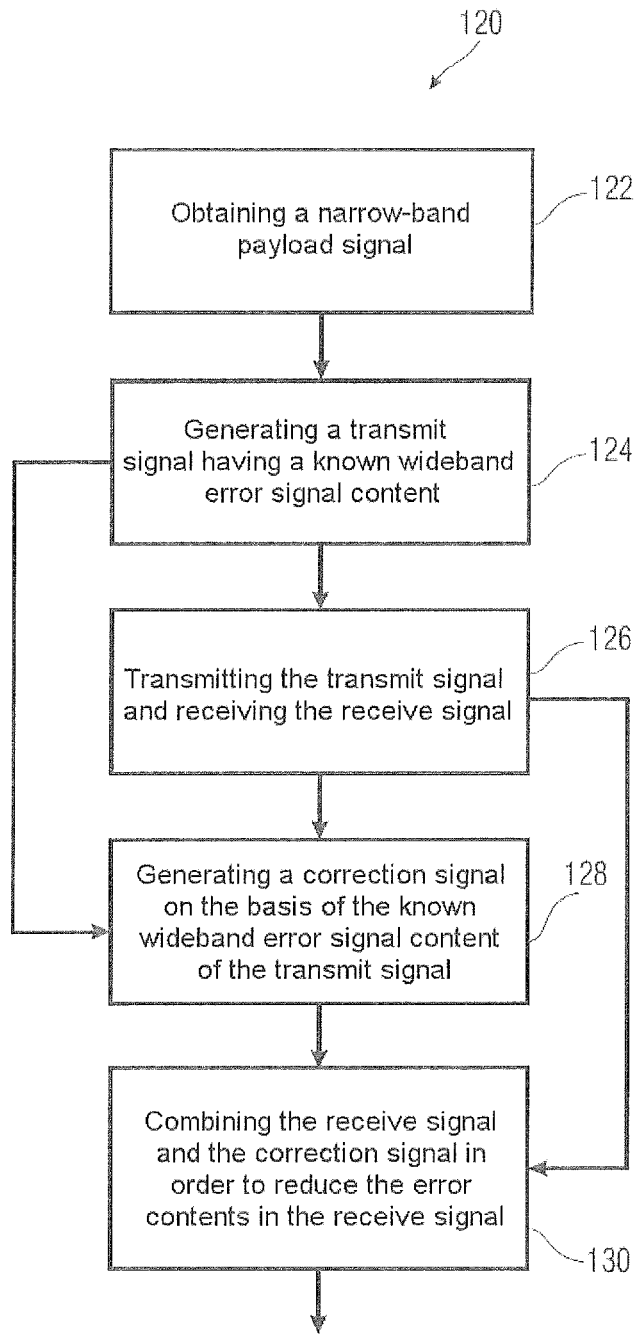
FIG. 2 shows an exemplary embodiment of a method for reducing known wideband error signal components of a transmit signal in a receive signal.

FIG. 2 shows an exemplary embodiment of a method 120 for reducing known wideband error signal components of a transmit signal in a receive signal. In a first step 122, a narrow-band payload signal is obtained. In a second step 124, a transmit signal having a known wideband error signal component is generated based on the narrow-band payload signal. In exemplary embodiments, the transmit signal exhibits in the frequency domain a wideband error signal component that extends into the receive band of the receiver and thus interferes with or is superimposed on the receive signal.

In a third step 126, the transmit signal is transmitted on a transmit frequency and the receive signal is received on a receive frequency. In this event, a proportion of the known wideband error signal component of the transmit signal is superimposed on the receive signal. In exemplary embodiments, a proportion of the known wideband error signal component of the transmit signal can be superimposed on the receive signal, e.g. via a transmitting/receiving interface or via the channel.

By means of a fourth step 128, a correction signal is generated based on the known wideband error signal component of the transmit signal or of a signal derived therefrom. In exemplary embodiments, the correction signal can, e.g., correspond to the proportion of the known wideband error signal component of the transmit signal that is superimposed on or interferes with the received signal. That is to say the proportion of the known wideband error signal component of the transmit signal which is located in the receive bandwidth of the receive signal.

Via a fifth step 130, the receive signal is combined with the correction signal in order to reduce the proportion based on the known wideband error signal component of the transmit signal in the receive signal. In exemplary embodiments, the correction signal, e.g., can be subtracted from the receive signal, e.g. taking into consideration channel estimation data, in order to obtain a receive signal with reduced error signal components.

The order of the steps of the method according to the invention, shown in FIG. 2, is a diagrammatic representation that does not imply any order in time. In exemplary embodiments, the fourth step 128, e.g., can occur in parallel with the second step 124 in time. In other exemplary embodiments, the fourth step 128, e.g., can follow the second step 124 or the third step 126 in time.

Figure 3:
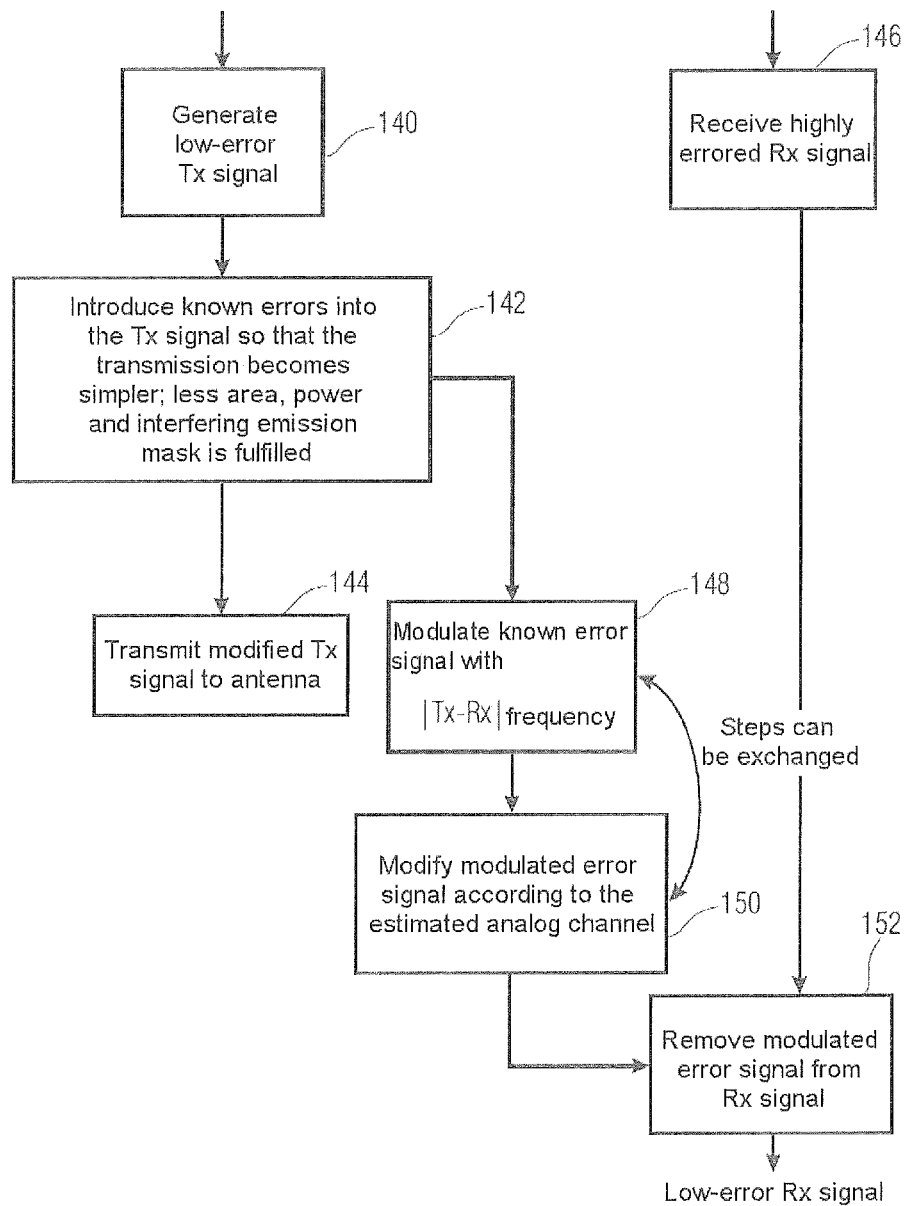
FIG. 3 shows an exemplary embodiment of a method for reducing a known wideband error signal component of a transmit signal in a receive signal.

FIG. 3 shows an exemplary embodiment of a method for reducing a known wideband error signal component of a transmit signal in a received signal. In a first step 140, a low-error Tx signal, e.g. a wideband payload signal or signal to be transmitted, respectively, is generated. In a second step 142, a known error is introduced into the Tx signal so that the transmission becomes more simple, e.g. This enables, e.g., the area, e.g. the semiconductor area of the semiconductor chip to become smaller and the power for operating the hardware, e.g., the semiconductor chip to become less. In addition, a known error is introduced into the Tx signal in such a manner that in the spectrum, a disturbing emission mask is fulfilled or can be recognized in the received band of the receiver. In a third step 144, the modified Tx signal is transmitted to an antenna and transmitted by means of the antenna, e.g., via a channel.

In a fourth step 146, a high-error or greatly errored Rx signal is received. In this context, a proportion of the known wideband error signal component of the transmit signal or of the modified Tx signal, respectively, is superimposed on the Rx signal. The superposition can here be effected, e.g., via the antenna and/or via the transmission medium or the transmission channel.

In a fifth step 148, the known error signal is modulated by an amount of a difference between the transmit frequency $f_{Tx}$ and the receive frequency $f_{Rx}$ or shifted in the frequency domain ($|f_{Tx}-f_{Rx}|$) in order to obtain the known wideband error signal components of the transmit signal or Tx signal, respectively, in the area of the received frequency or in the received band of the receiver. In exemplary embodiments, the modulated error signal thus corresponds to the component of the known wideband error signal component of the transmit signal that is superimposed on the received signal.

In a sixth step 150, the modulated error signal is modified in accordance with the estimated analog channel. In exemplary embodiments, the correction signal can thus be modified in accordance with the transmission channel, taking into consideration the channel estimation data, in order to take into consideration the errors, e.g. transmission errors, of the channel.

In the exemplary embodiment shown in FIG. 3, the fifth step 148 and the sixth step 150 can be exchanged. In exemplary embodiments, the known wideband error signal component of the transmit signal or Tx signal, respectively, can thus be modified firstly by using channel estimation data and subsequently modulated or shifted by the amount of the difference between the transmit frequency and the receive frequency.

In a seventh step 152, the modulated error signal is removed from the Rx signal. For this purpose, the modified modulated error signal can be subtracted from the Rx signal, for example, in order to obtain a low-error Rx signal.

Figure 4:
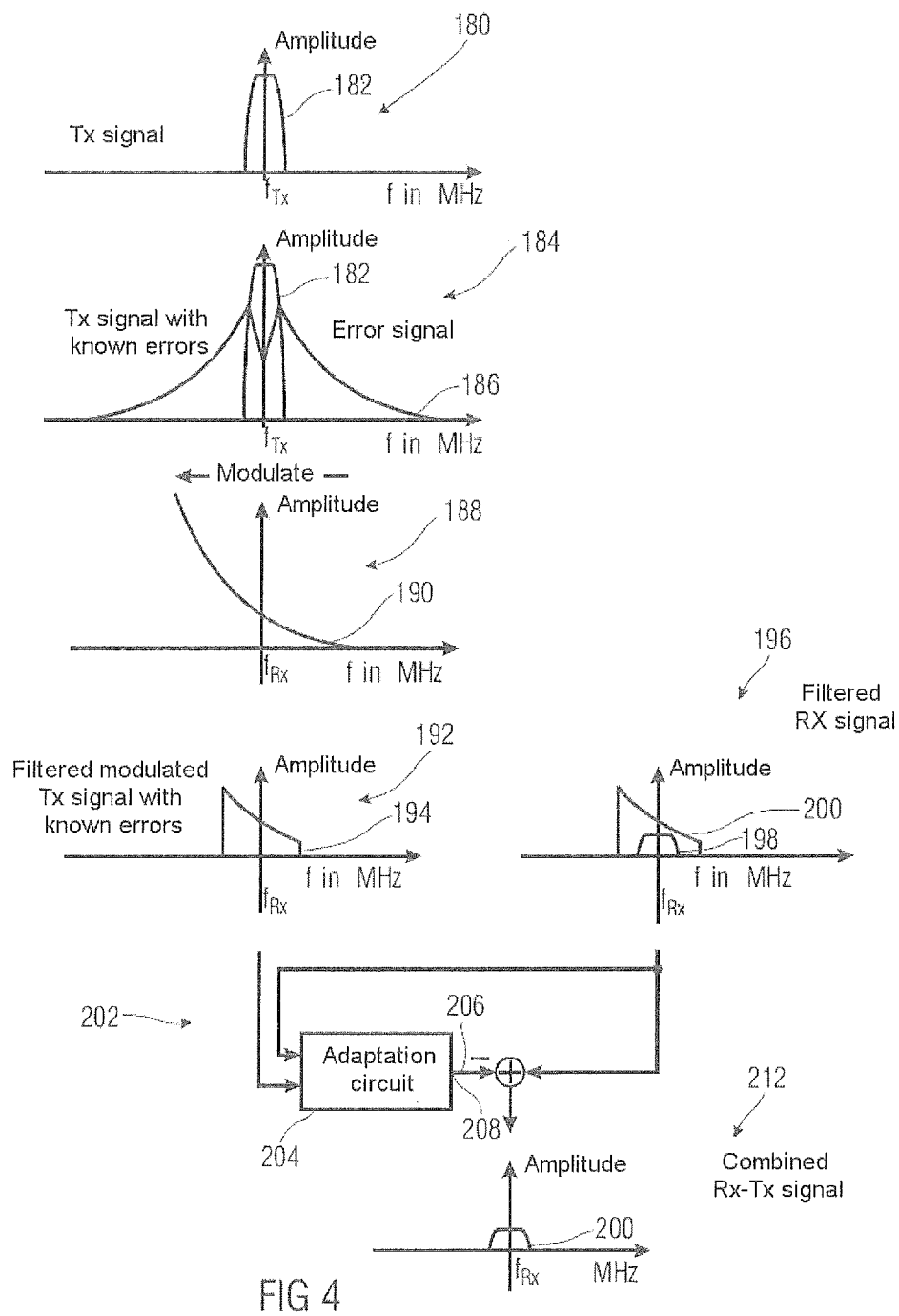
FIG. 4 shows a graphical view of the signals that can be produced in the individual steps of the actual exemplary embodiment of the method according to FIG. 3.

FIG. 4 shows a graphical view of the signals which can arise during the individual steps of the actual exemplary embodiment of the method according to FIG. 3. A first graph 180 shows the Tx signal 182 in accordance with step 140 from FIG. 3 or an exemplary embodiment of the narrow-band payload signal, the frequency being plotted on the abscissa in MHz and the amplitude being plotted on the ordinate. The Tx signal 182 shown in graph 180 is an ideal Tx signal and would correspondingly not be superimposed on the Rx signal or receive signal on the receive frequency or, respectively, not disturb the receive band of the receiver.

A graph 184 shows the Tx signal 182 from graph 180 and an exemplary embodiment of the known error signal 186 that is introduced into the Tx signal 182 according to step 142 from FIG. 3 in order to obtain a transmit signal having a known wideband error signal component, the frequency being plotted on the abscissa in MHz and the amplitude being plotted on the ordinate. It should be pointed out also that the error signal 186 shown by way of example in graph 184 exhibits an exaggerated or distinctly excessive amplitude for illustration purposes. In actual exemplary embodiments, the amplitude of the error signal 186 is selected in such a manner that a conventional base station can receive the Tx signal 182 without problems.

The exemplary embodiment, shown in graph 184, of a transmit signal which has the Tx signal 182 and the error signal 186 in the spectrum can be generated, e.g., by a combination of both signals. For this purpose, the transmit signal generator can exhibit, e.g., an error signal generator which is constructed for generating the known wideband error signal. Furthermore, the transmit signal generator can exhibit a signal combiner which is constructed to combine the narrowband payload signal with the known wideband error signal. In exemplary embodiments, the combining can be effected, e.g., by an addition of both signals.

A graph 188 shows a modulated known error signal 190 according to step 148 from FIG. 3, the frequency being plotted on the abscissa in MHz and the amplitude being plotted on the ordinate. The modulation of the known error signal 186 by the amount of the difference between transmit frequency $f_{Tx}$ and receive frequency $f_{Rx}$ thus generates a shift of the error signal 186 from the receive bandwidth into the transmit bandwidth or from the receive frequency $f_{Rx}$, respectively, to the transmit frequency $f_{Tx}$ so that a modulated known error signal 190 is produced. The graph 188 thus shows an exemplary embodiment of the known wideband error signal component of the transmit signal that is in the area of the receive band of the receiver and is superimposed on or disturbs the receive signal. In the graph 188, the complete signal variation of the modulated transmit signal or of the modulated Tx signal, respectively, with the known error from graph 184 is not shown, for the sake of clarity, rather only a section of the modulated known error signal 186 or of the modulated known wideband error signal component of the transmit signal is shown.

The modulated known error signal 190 can also be filtered, e.g., by using a bandpass filter, the bandpass filter being tuned, e.g., to the receive frequency $f_{Rx}$. A graph 192 shows an exemplary embodiment of a modulated error signal 194 filtered by means of a bandpass filter, or of the filtered modulated Tx signal having a known error, the frequency being plotted on the abscissa in MHz and the amplitude being plotted on the ordinate. The filtered modulated error signal 194 thus corresponds to the proportion of the error signal 186 that is located in the receive band of the receiver. Graph 192 thus shows an exemplary embodiment of the proportion of the known wideband error signal component of the transmit signal that is superimposed on the receive signal.

A graph 196 also shows an Rx signal 198 filtered by means of a receive bandpass filter, a proportion 200 of the known error signal 186 being superimposed on the Rx signal 198, the distortions caused by the channel not being shown for the sake of clarity. Graph 196 thus shows an exemplary embodiment of the receive signal on which a proportion of the known wideband error signal component of the transmit signal is superimposed, as a result of which the receive signal can no longer be received without errors under normal circumstances and the information contained in the receive signal can no longer be reconstructed. However, since a proportion of the known error signal component of the transmit signal is superimposed on the receive signal, it is possible to generate a correction signal that reduces the proportion of the known error signal component of the transmit signal in the receive signal 107 by means of a combination.

A diagrammatic representation 202 shows an exemplary embodiment of the modification of the filtered modulated error signal 194 from graph 192 and an exemplary embodiment of the combination of the filtered modulated error signal 194 with the filtered Rx signal 198 from graph 196 on which a proportion 200 of the known error signal 186 is superimposed, similar to steps 150 and 152 from FIG. 3. An adaptation circuit 204 is configured to adapt the filtered modulated error signal 194 to the Rx signal 198 with the proportion of the known error signal 200, using channel estimation data. The adaptation circuit 204 can also have an output that is configured to output an adapted signal 206. This adapted signal 206 can then be subtracted from the Rx signal 198, on which the proportion 200 of the known error signal 186 is superimposed, as a result of which a combined Rx-Tx signal having a reduced error signal component is produced. A graph 212 shows the combined Rx-Tx signal 210, the frequency being plotted on the abscissa in MHz and the amplitude being plotted on the ordinate.

The order of steps of the modulation, the filtering and the modification, shown in the exemplary embodiment in FIG. 4, can naturally be arbitrarily exchanged so that these steps can be performed in another order by a device according to the invention and by a method according to the invention in other exemplary embodiments. Thus, in one exemplary embodiment, the error signal can thus be filtered first by using a bandpass filter that is tuned to the receive frequency and then modulated or shifted by the amount of the difference between receive frequency and transmit frequency before the modification according to the estimated channel is performed by means of the adaptation circuit. Furthermore, the modulation, the filtering and the modification can occur in the baseband, in the carrier frequency band or at an intermediate frequency in exemplary embodiments.

Although many aspects have been described in conjunction with a device, these aspects naturally also represent a description of the corresponding method so that a block or a component of a device can also be understood to be a corresponding method step or a feature of a method step. Analogously, aspects which have been described in conjunction with a or as a method step also represent a description of a corresponding block or detail or feature of a corresponding device. Some or all of the method steps can be performed by a hardware apparatus (or by using a hardware apparatus) such as, for example, a microprocessor, a programmable computer or an electronic circuit. In some exemplary embodiments, some or several of the most important method steps can be carried out by such apparatus.

Depending on particular implementation requirements, exemplary embodiments of the invention can be implemented in hardware or in software. The implementation can be carried out by using a non-transitory digital storage medium, for example a floppy disk, a DVD, a Blu-ray disk, a CD, a ROM, a PROM, an EPROM, an EEPROM or a FLASH memory, a hard disk or another magnetic or optical memory on which electronically readable control signals are stored which can interact or interact with a programmable computer system in such a manner that the respective method is performed. The digital storage medium can therefore be computer-readable.

Some exemplary embodiments according to the invention thus comprise a data carrier that has electronically readable control signals that are capable of interacting with a programmable computer system in such a manner that one of the methods described herein is performed.

In general, exemplary embodiments of the present invention can be implemented as computer program product comprising a program code, the program code being effective for performing one of the methods when the computer program product runs on a computer.

The program code can also be stored, for example, on a non-transitory machine-readable carrier.

Other exemplary embodiments comprise the computer program for performing one of the methods described herein, the computer program being stored on a non-transitory machine-readable carrier.

In other words, an exemplary embodiment of the method according to the invention is thus a computer program which has a program code for performing one of the methods described herein when the computer program runs on a computer.

A further exemplary embodiment of the methods according to the invention is thus a data carrier (or a digital storage medium or a computer-readable medium) on which the computer program for performing one of the methods described herein is recorded.

A further exemplary embodiment of the method according to the invention is thus a data stream or a sequence of signals that represents or which represent, respectively, the computer program for performing one of the methods described herein. The data stream or the sequence of signals can be configured, for example, to be transferred via a data communication link, for example via the Internet.

A further exemplary embodiment comprises a processing device, for example a computer or a programmable logic component which is configured or adapted for performing one of the methods described herein.

A further exemplary embodiment comprises a computer on which the computer program for performing one of the methods described herein is installed.

A further exemplary embodiment according to the invention comprises a device or a system which is designed for transmitting a computer program for performing at least one of the methods described herein to a receiver. The transmission can be effected, for example, electronically or optically. The receiver can be, for example, a computer, a mobile device, a storage device or a similar device. The device or the system can comprise, for example, a file server for transmitting the computer program to the receiver.

In some exemplary embodiments, a programmable logic component (for example a field-programmable gate array, an FPGA) can be used for performing some or all functionalities of the methods described herein. In some exemplary embodiments, a field-programmable gate array can interact with a microprocessor in order to perform one of the methods described herein. In general, the methods are performed by an arbitrary hardware device in some exemplary embodiments. This can be a universally applicable hardware or a computer processor (CPU) or hardware specific to the method such as, for example, an ASIC.

The exemplary embodiments described above only represent an illustration of the principles of the present invention. Naturally, modifications and variations of the arrangements and details described herein will be obvious to other experts. It is therefore intended that the invention is restricted only by the protective scope of the subsequent patent claims and not by the specific details which have been presented herein by means of the description and the explanation of the exemplary embodiments.

The invention claimed is:

1. A device for reducing an error signal component of a transmit signal in a receive signal, comprising:
    an interface configured to obtain a narrow-band payload signal;
    a transmit signal generator configured to generate a transmit signal having a known wideband error signal component based on the narrow-band payload signal;
    a transmitting/receiving device configured to transmit the transmit signal at a transmit frequency and receive the receive signal at a receive frequency, wherein a proportion of the known wideband error signal component of the transmit signal being superimposed on the receive signal;
    a correction signal generator configured to generate a correction signal based on the known wideband error signal component of the transmit signal or a signal derived therefrom; and
    a combiner configured to combine the receive signal with the correction signal in order to reduce in the receive signal the proportion that is based on the known wideband error signal component of the transmit signal.

2. The device as claimed in claim 1, wherein the transmitting/receiving device further comprises a transmitting/receiving interface for connection to a channel.

3. The device as claimed in claim 2, wherein the transmitting/receiving interface is configured such that a proportion of the known wideband error signal component of the transmit signal is superimposed on the receive signal.

4. The device as claimed in claim 3, wherein the correction signal generator is further configured to generate the correction signal by using channel estimation data.

5. The device as claimed in claim 1, wherein the correction signal generator further comprises a modulation device configured to modulate the known wideband error signal component of the transmit signal or a signal derived therefrom by an amount of a difference between the transmit frequency and the receive frequency.

6. The device as claimed in claim 1, wherein the correction signal generator further comprises a bandpass filter.

7. The device as claimed in claim 1, further comprising a filter device configured to filter the receive signal with a receive bandpass filter to obtain a filtered version of the receive signal.

8. The device as claimed in claim 1, wherein the transmit signal generator further comprises a pulse-shaping filter.

9. The device as claimed in claim 1, wherein the transmit signal generator further comprises an error signal generator and a signal combiner, wherein the error signal generator is configured to generate a known wideband error signal, and the signal combiner is configured to combine the narrow-band payload signal with the known wideband error signal to generate the transmit signal having a known wideband error signal component.

10. The device as claimed in claim 9, wherein the transmit signal generator comprises a convolutional device configured to convolve the narrow-band payload signal with the pulse-shaping filter in order to generate the transmit signal having a known wideband error signal component.

11. A device for reducing an error signal component of a transmit signal in a receive signal, comprising:
    an interface configured to receive a narrow-band payload signal;
    a transmit signal generator configured to generate a known wideband error signal, and combine the known wideband error signal with the narrow-band payload signal in order to generate the transmit signal having a known wideband error signal component;

a transmitting/receiving device configured to transmit the transmit signal in a transmit band and receive the receive signal in a receive band, wherein a proportion of the known wideband error signal component of the transmit signal is superimposed on the receive signal;

a correction signal generator configured to generate a correction signal based on the known wideband error signal component of the transmit signal or a signal derived therefrom, by using channel estimation data; and a combiner configured to combine the receive signal with the correction signal to reduce in the receive signal a proportion that is based on the known wideband error signal component of the transmit signal.

12. The device as claimed in claim 11, wherein the transmitting/receiving device further comprises a transmitting/receiving interface for connection to a channel, the transmitting/receiving interface configured such that a proportion of the known wideband error signal component of the transmit signal is superimposed on the receive signal.

13. The device as claimed in claim 11, wherein the correction signal generator also comprises a bandpass filter and a modulation device, wherein the modulation device is configured to modulate the known wideband error signal component of the transmit signal by an amount of a difference between transmit frequency and receive frequency, and the bandpass filter is configured to filter the modulated version of the known wideband error signal component of the transmit signal in order to obtain a correction signal that exhibits the proportion of the known wideband error signal component of the transmit signal that is superimposed on the receive signal.

14. The device as claimed in claim 11, wherein the correction signal generator also comprises a bandpass filter and a modulation device, wherein the bandpass filter is configured to filter the known wideband error signal component of the transmit signal and the modulation device is configured to modulate the filtered version of the known wideband error signal component of the transmit signal by an amount of a difference between the transmit frequency and the receive frequency to obtain a correction signal that exhibits the proportion of the known wideband error signal component of the transmit signal that is superimposed on the receive signal.

15. The device as claimed in claim 11, wherein the combiner is configured to subtract the correction signal from the receive signal in order to reduce the proportion that is based on the known wideband error signal component of the transmit signal in the receive signal.

16. A method for reducing error signal components of a transmit signal in a receive signal, comprising:

obtaining a narrow-band payload signal;

generating a transmit signal having a known wideband error signal component based on the narrow-band payload signal, transmitting the transmit signal on a transmit frequency and receiving the receive signal on a receive frequency, wherein a proportion of the known wideband error signal component of the transmit signal is superimposed on the receive signal;

generating a correction signal based on the known wideband error signal component of the transmit signal or a signal derived therefrom; and combining the receive signal with the correction signal in order to reduce the proportion that is based on the known wideband error signal component of the transmit signal in the receive signal.

17. The method as claimed in claim 16, wherein, in the step of generating the correction signal, the correction signal is also generated by using channel estimation data.

18. The method as claimed in claim 16, wherein, in the step of generating the correction signal, the known wideband error signal component of the transmit signal is also modulated by an amount of a difference between the transmit frequency and the receive frequency, and wherein the modulated version of the known wideband error signal component of the transmit signal is also filtered by means of a bandpass filter in order to obtain a correction signal that exhibits the proportion of the known wideband error signal component of the transmit signal that is superimposed on the receive signal.

19. The method as claimed in claim 16, wherein, in the step of generating the correction signal, the known wideband error signal component of the transmit signal is also filtered by means of a bandpass filter and wherein the filtered version of the known wideband error signal component of the transmit signal is also modulated by an amount of a difference between the transmit frequency and the receive frequency in order to obtain a correction signal that exhibits the proportion of the known wideband error signal component of the transmit signal that is superimposed on the receive signal.

20. The method as claimed in claim 16, wherein, in the step of combining the correction signal and the receive signal, the correction signal is subtracted from the receive signal.

21. A method for reducing an error signal component of a transmit signal in a receive signal, comprising:

obtaining a narrow-band payload signal;

generating a known wideband error signal;

combining the known wideband error signal with the narrow-band payload signal to obtain a transmit signal having a known wideband error signal component;

transmitting the transmit signal in a transmit band and receiving the receive signal in a receive band, a proportion of the known wideband error signal component of the transmit signal being superimposed on the receive signal;

generating a correction signal based on the known wideband error signal component of the transmit signal or a signal derived therefrom, using channel estimation data; and combining the receive signal with the correction signal to reduce the proportion that is based on the known wideband error signal component of the transmit signal in the receive signal.

* * * * *